April 20, 1954  W. FREY ET AL  2,675,890
PROCESS FOR SEPARATING CHLORIDES FROM GASEOUS MIXTURES THEREOF
Filed March 15, 1951  2 Sheets-Sheet 1

INVENTORS
WALTER FREY
ROBERT WEBER
BY Pollard and Johnston
ATTORNEYS

Patented Apr. 20, 1954

2,675,890

UNITED STATES PATENT OFFICE 2,675,890

PROCESS FOR SEPARATING CHLORIDES FROM GASEOUS MIXTURES THEREOF

Walter Frey, Basel, and Robert Weber, Muttenz, Switzerland, assignors to Saurefabrik Schweizerhall, Schweizerhalle, Baselland, Switzerland, a corporation of Switzerland Application March 15, 1951, Serial No. 215,752

Claims priority, application Switzerland January 25, 1949

18 Claims. (Cl. 183—119)

This invention relates to certain improvements in or relating to a process for recovering the chloride products from gaseous mixtures obtained by the chlorination of titanium containing raw material; such as natural titanium ores such as rutile, ilmenite, etc., or titanium oxide containing slags as obtained; e. g., when recovering metallic iron from ilmenite by a reduction process.

These raw materials always contain in addition to titanium oxide substantial amounts of other metal oxides and of silicon oxides.

Rutile, e. g., may contain, besides 90–96% $TiO_2$, from 1 to several percents of iron oxide, zirconium oxide, aluminum oxide and silicon oxide. Minor amounts of chromic oxide, columbium oxide and vanadium pentoxide are also present. Ilmenite may contain 40 to 60% $TiO_2$, large amounts of iron oxide (50 to 30%), lower amounts of the oxides of aluminum, silicon, chromium, vanadium and small amounts of the oxides of columbium (niobium), zirconium and the rare earths.

Ilmenite-slag is obtained by reducing ilmenite with carbon to recover metallic iron by a process wherein various amounts of oxides of magnesium, calcium and aluminum may be added to lower the melting point of the slag. It contains 60 to 70% of titanium oxide, yet up to 10% of iron oxide, several percents (even up to 15% of each) of the added oxides of aluminum, magnesium and calcium and varying amounts of the oxides of vanadium, silicon, columbium, zirconium, etc.

This invention, however, is not restricted to the chlorination of the three materials above mentioned, but relates also to the chlorination of mixtures of these materials or the chlorination of still other titanium containing materials like ilmenorutile which may contain higher amounts of columbium oxide.

The chlorination of these materials is performed in the presence of reducing agents, for example, carbonaceous reducing materials, such as coke, coal and charcoal. The finely divided raw material may be briquetted with pulverized carbon and coal tar or pitch before chlorination, or a suspension of the mixture of pulverized titanium material and pulverized carbon in chlorine gas may be used. As is known, the chlorination process proceeds at temperatures between 500° C. and 1,500° C. preferably between 700° C. and 1,000° C. The gases produced during chlorination contain, in addition to gases which do not condense under normal conditions, such as carbon monoxide, carbon dioxide, hydrochloric acid gas, chlorine and the like, the volatile metallic chlorides which have been formed. Part of these chlorides condense in liquid form, such as titanium tetrachloride and silicon chloride, while others may separate out as solids, such as chlorides of iron, aluminum, zirconium, chromium and columbium.

These different chlorides have, of course, different condensation temperatures. The sublimation and boiling points at normal pressure cover a large range of temperatures; ferrous chloride, e. g., condenses at about 1,020° C., whereas silicon tetrachloride condenses at 57° C. The actual condensation point of each of the chlorides in the chlorination gases depends on the partial pressure the corresponding chloride exerts in the gaseous mixture.

It is often necessary or desirable to obtain a gas substantially free of halogenated compounds. Under such circumstances the removal of normally gaseous chlorides, such as hydrogen chlorides, constitutes an additional problem.

In spite of the different condensation points, from a practical point of view, the recovery or separation of the chlorides contained in the chlorination gases has proved very difficult. A separation, and preferably a separate recovery of the chlorides, however, is important for their industrial utilization.

For example, the separation of part of the normally solid metallic chlorides, such as the chlorides of iron, zirconium, chromium, etc., from the normally liquid metallic chlorides may be effected by first cooling the gaseous products of chlorination (chlorination gases) down to somewhat above, but advantageously near, the dew point of the liquid titanium tetrachloride, thus precipitating out the solid metallic chlorides, and then removing them from the gas by means of dust separators. In this manner a gas can be obtained which is substantially free from suspensions. The gas then contains as vapors the whole quantity of the metallic chlorides which remain liquid at normal temperatures, especially all of the $TiCl_4$.

Yet, practical difficulties now arise in the condensation of the vaporous but normally liquid metallic chlorides. Even after the complete elimination of the suspended solid metallic chlorides, separating out above the dew point, the gaseous mixture which is now free from suspensions still contains a certain percentage of chlorides which are solid at normal temperatures, above all aluminum chloride. These chlorides, however, in particular the chloride of aluminum, are not contained in the waste gases in suspension, but according to their vapor pressure in the form of vapors.

If, for instance, a rutile containing 96% of

TiO₂, which in addition to other oxidic impurities, such as iron and chromium oxides, contains also about 2% of aluminum oxide, is chlorinated, a gaseous mixture will be formed according to the equations:

$$TiO_2 + 2C + 2Cl_2 = 2CO + TiCl_4$$
$$Al_2O_3 + 3C + 3Cl_2 = Al_2Cl_6 + 3CO$$

This mixture, after being freed of solid chlorides having high sublimation points (such as the chlorides of iron and chromium), contains at a total pressure of 760 mm. the titanium chloride with a partial pressure of about 250 mm. and the aluminum chloride with a partial pressure of 2 to 2.5 mm. Under these conditions, the titanium chloride begins to condense at about 100° C. and the separation of aluminum chloride begins also at about 100° C. The vapors freed from those solid chlorides condensing at temperatures above 100° C. therefore contain in such instances, in addition to titanium chloride, aluminum chloride as vapors.

This aluminum chloride, which separates out almost simultaneously with the titanium tetrachloride, may now give rise to serious troubles in the condensation of the titanium chloride. If, for instance, the titanium chloride is condensed in an ordinary tubular cooler, the aluminum chloride will have a tendency to separate for the most part on the walls of the cooler in solid form, thereby clogging the cooler within a very short time. Due to the simultaneously separating aluminum chloride, disturbances in the operation of the system may also occur, if the titanium chloride is condensed by washing it with liquid titanium chloride. For instance, the aluminum chloride may precipitate upon the packings of the washing tower or, if no packings are used, on the walls of the latter as well as in the discharge conduits for the condensed chloride, thereby necessarily leading to obstructions.

It is an object of this invention to separate the chlorides from gaseous mixtures thereof obtained by the chlorination of oxidic metals.

It is another object of the invention to separate normally solid, normally liquid and normally gaseous chloride compounds from gaseous mixtures thereof obtained by the chlorination of oxidic compounds.

It is a further object of the invention to separate the chloride values from gases produced by chlorination of titanium-containing materials.

Yet another object of the invention is the separation of chlorides in liquid form from mixtures thereof wherein normally solid chlorides condense concurrently with the normally liquid chlorides.

It is a special object of this invention to separate chlorides from gaseous mixtures containing titanium tetrachloride and aluminum chloride.

Other objects, purposes and advantages of the invention will be apparent from the more detailed description which follows.

We have now found that the aluminum chloride is readily soluble in warm and hot titanium tetrachloride and only to a very limited degree in cold titanium tetrachloride. This solubility amounts to more than 9% at a temperature of 80° C. but is surprisingly decreased to 0.2% at 20° C. Thus, the total of the aluminum chloride formed during a chlorination of rutile, such as previously described and which is still present in vaporous form after the elimination of the solid chlorides in suspension, is soluble at higher temperatures in the titanium chloride being condensed. In application of these findings the condensation of the bulk of the titanium tetrachloride is effected in successive liquid condensation stages of successively cooler temperatures, wherein temperatures are so adjusted that the metallic chlorides which are solid at normal temperatures and which condense conjointly with the liquid titanium chloride dissolve in the condensing or condensed liquid metallic chlorides. If desired, after the condensation is completed, the solid metallic chlorides are separated from the titanium chloride by cooling down the warm condensation products. The solid chlorides may be recovered by filtration or other known procedures. Thus under the conditions just described, the chlorination gas may be cooled down initially to about 60° C., whereby about 80% of the titanium chloride will be condensed in addition to at least 95% of the aluminum chloride. The condensation product contains then about 2% of aluminum chloride. The gas thereupon may be cooled down in a second stage to about 20° C., thereby separating out again about 15% of the titanium chloride together with at most some few per cent of the aluminum chloride, so that the condensed titanium chloride contains only about 0.1 per cent of aluminum chloride. By further cooling the gas, at least in a third stage to about —20° C., once more a large part of the remaining titanium chloride can be condensed. The concentration of titanium tetrachloride in the exit gases then will be about 5 gr./m.³.

When chlorinating ores having another or even a higher content of aluminum and/or titanium oxide, the temperature of the successive stages of condensation of the titanium chloride should be adjusted in conformity with the content of alumina. If the aluminum oxide content of the raw material is high, e. g., over 2%, part of the aluminum chloride will condense above the dew point of the titanium chloride as solid aluminum chloride together with part of the ferric chloride. It is preferable in this case to perform the elimination of the solid chlorides very near yet above the dew point of TiCl₄, e. g., 5 to 10° C. above.

Ferric chloride has a rather high condensation point and should exert at temperatures near yet above the dew point of titanium tetrachloride only a very small partial pressure, e. g., the theoretical partial pressure of ferric chloride at 100° C. is about 10⁻⁴ mm. Hg; therefore a practically complete removal of FeCl₃ as solid chloride should be possible above the dew point of TiCl₄. It has been found, however, that in the presence of aluminum chloride the vapor pressure of ferric chloride is increased very much. It is believed that the reason for this increase is the formation of double chlorides such as FeCl₃.AlCl₃. In the presence of aluminum chloride vapor with a partial pressure of about 2 mm. Hg the calculated partial pressure of ferric chloride may increase at about 100° C. up to 0.05 mm. The titanium chloride therefore may contain after condensation up to 0.1% of FeCl₃. Whereas the solubility of pure FeCl₃ in cold and hot TiCl₄ is very low (about 0.02% at the boiling point), its solubility is increased in the presence of AlCl₃ to such a degree that all of the iron chloride, which is present in vaporous form at temperatures of 100° C. to 150° C. dissolves in hot titanium chloride (e. g., temperatures of 100° C.).

Similar conditions occur in chlorinating titanium ores which include niobium and tantalum oxide as secondary metallic oxides. The chlorides and oxychlorides of niobium and tantalum too are soluble in titanium chloride in quantities increasing with rising temperatures. Also in such instances the temperature of the successive condensation stages are to be adjusted according to the solubility of said chlorides and to the contents of the corresponding oxides in the raw material. In chlorinating ores yielding besides $TiCl_4$ other liquid metallic chlorides, such as for instance $SiCl_4$, the temperatures are to be adapted to the solubility of the aluminum chloride or other normally solid metallic chlorides contained in the corresponding mixture of liquid chlorides.

Cooling to condense the normally liquid metallic chloride may be effected either indirectly, e. g., by means of a tubular cooler, or directly by means of a cooled chloride, e. g., in spray-condensers. In the latter case it is advantageous to utilize the cooled-down condensate for the direct cooling. In order to prevent in this procedure an enrichment of aluminum chloride in the cooling agents, i. e., in the condensates of titanium tetrachloride of the successive stages, it is advantageous to conduct the condensate from the coolest stage successively to the hotter ones, counter to the flow of gases, and to withdraw the total amount of the metallic chloride formed from the first, hottest cooling stage.

The gases after having passed the described condensation steps still contain small amounts of titanium tetrachloride and also small amounts of silicon tetrachloride, but in addition they contain higher amounts of hydrogen chloride and small amounts of chlorine and consist in the major part of carbon monoxide and carbon dioxide.

New difficulties, however, are faced in the further separation of the components of the gases, particularly in the complete removal of the volatile titanium tetrachloride and silicon tetrachloride.

It has already been proposed to remove the titanium-tetrachloride vapor which is contained in the gases, after condensation of the major part of the chlorides at temperatures of about 0° C., by washing the gas with an aqueous medium of room temperature, e. g., water or an aqueous solution of titanium chloride. Such washing, however, hydrolizes the metallic chloride, and the product of the hydrolysis is then obtained, according to the acidity of the washing liquid, either dissolved or solid. The process as just described, therefore, does not permit a complete recovery of the titanium chloride in anhydrous form.

It has been found, moreover, that by proceeding in this way the product of the hydrolysis is obtained in such a fine suspension or mist that it is very difficult to completely remove such suspension or mist from the gas. This is, however, absolutely indispensable, e. g., in the recovery and further utilization of hydrogen chloride as aqueous hydrochloric acid. Otherwise the hydrochloric acid obtained would have an unsatisfactorily high content of titanium chloride and other metallic impurities.

It has been found that it is advantageous to add after the cooling down to about −20° C. still a further condensation step by cooling down the gases to at least −30° C., preferably to −40° C. At these temperatures, however, the titanium chloride will condense not in liquid form but in solid form, its melting point lying slightly above −30° C. The concentration of the titanium tetrachloride in the gases can be decreased by this procedure to about 0.5 to 1.0 gr. $TiCl_4/m^3$. If after this step the hydrogen chloride is recovered as hydrochloric acid by washing the gases with water, one can recover a fairly pure acid. As the gases contain between 3 to 10% by volume of HCl the recovered acid will have a content of between 0.05 to 0.5% by weight of $TiCl_4$.

It may be advantageous, however, to still further decrease the titanium tetrachloride concentration in order to get a more pure hydrochloric acid.

Now it has been found that it is possible to completely remove the titanium tetrachloride vapors in anhydrous form by conducting the waste gases after the condensation over solid adsorbents. Then pure hydrochloric acid may be obtained from the waste gases which no longer contain titanium tetrachloride.

However, it is advantageous to condense prior to the adsorption of the titanium chloride as much as possible of the latter directly in liquid form in order to keep the load on the absorbents as low as possible.

After the chlorination gases have passed the last condensation stage they are now conducted over solid adsorbents, by means of which substantially all of the remainder of the titanium chloride and also silicon tetrachloride still contained in the gas is removed. Suitable solid adsorbents which may be used include active carbon, silica gel, active aluminum oxide and other active substances. By adsorption with aid of dry active carbon, the concentration of titanium chloride in the gas can be reduced to less than 0.01 and even down to 0.001 gram per $m^3$. The quantity of titanium chloride adsorbed by the active carbon amounts to a considerable per cent of its own weight. Conditions are similar when employing other adsorbing agents.

It is important to recover the titanium chloride from the adsorbing agent and to reactivate this agent for further adsorption. For example, the titanium chloride is set free by heating the active substances at normal or reduced pressure. This expulsion by heating may be hastened by conducting over the adsorbent gases, which are inert towards both the metallic chloride and the adsorbing agent, a particularly suitable inert gas being the chlorination gas substantially freed from metallic chlorides. In general, temperatures between 300° to 600° C. are sufficient for recovering the major part of the adsorbed chloride and for reactivating the adsorbent.

It is very important that the adsorbents be absolutely dry before they are used. Any small trace of moisture in the adsorbent will not only reduce its activity but will cause trouble in the production. The titanium tetrachloride will be hydrolized by the moisture and the hydrolized chloride will cover the active centers of the adsorbent and will cause a severe increase of flow resistance. The best method of drying is to heat up the active carbon to about 400 to 600° C. in a slow stream of dry nitrogen.

The life of the active carbon can further be increased by removing also the traces of oxygen on the surface of the carbon. These traces of oxygen on the surface will react with the titanium tetrachloride during the recovery step when the carbon is heated up to 300 to 600° C. The titanium oxide thereby formed will destroy the active centers. It is advisable to remove these traces of oxygen in the carbon before using it by conducting, prior to the drying process, a slow stream of hydrogen over the carbon at temperatures of 400 to 600° C. Whereas a carbon which has not been treated with hydrogen will lose its activity after 4 to 5 cycles of recovery, a carbon so treated as described will not lose its activity after 20 cycles.

After the more or less complete removal of the titanium tetrachloride the hydrogen chloride may be recovered from the residue of gas in the form of pure hydrochloric acid by washing it with an aqueous medium and utilizing pure water or dilute hydrochloric acid as an absorbent. As already set forth, a crude gas obtained from titanium ore chlorination, for instance, contains, after the metallic chlorides having been adsorbed, usually 5 to 10 per cent by volume of hydrogen chloride. This hydrogen chloride is formed substantially by the reaction of chlorine with hydrogen, which is always present in the reducing carbonaceous materials required for chlorination. By a single-stage washing with pure water the content of hydrogen chloride in the waste gas may be reduced to less than 1%. In order to produce concentrated hydrochloric acid the application of a multistage washing process is more advantageous. In the first stage the gas is washed with a solution of dilute hydrochloric acid, which is produced in a succeeding washing stage, while pure water is utilized in the last stage.

After the crude gases have been treated as described in the foregoing, a gas is obtained which substantially consists only of carbon monoxide and carbon dioxide and which, due to its high content of carbon monoxide, is suitable as a fuel gas for a great variety of purposes. If it is intended to use this gas as an auxiliary gas in the decomposition of volatile metallic chlorides by means of oxygen containing gases, e. g., according to Swiss Patent 265,192 of February 20, 1948 (U. S. pat. applic. Ser. No. 75,886), it is advantageous to remove the moisture contained in the gas due to its washing with aqueous absorbents by drying, e. g., by means of concentrated sulphuric acid, silica gel, alumina, etc.

The process is not limited, however, in its possibility of application to the treatment of chlorination gases free from suspensions, but is suitable also, for instance, for treating chlorination gases in which the solid metallic chlorides having high sublimation points are condensed wholly or in part together with the liquid metallic chlorides. Nevertheless, as illustrated hereinafter, it is desirable to remove the suspended solid metallic chlorides especially when such chlorination gases contain considerable quantities of ferric chloride.

Three embodiments of an apparatus for practicing the process of this invention are diagrammatically illustrated in the accompanying drawings wherein.

Figure 1:
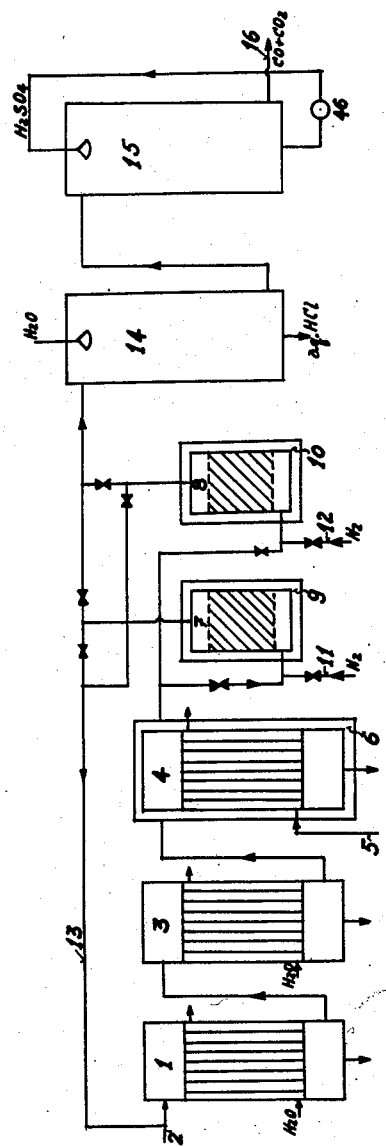
Fig. 1 illustrates an apparatus and flow diagram in which the metallic chlorides are condensed by indirect cooling.

As shown in Fig. 1, a mixture of chloride gases containing titanium tetrachloride from an outside source, such as obtained from the chlorination of a rutile ore previously described, and gases containing regenerated chloride vapors flowing from a later stage of the process through conduit 13, are introduced through conduit 2 into the first stage liquid condenser 1 which may be advantageously maintained, for example, at a temperature of 60° C. As shown, condenser 1 is provided with a water jacket for cooling to the desired temperature. The gases are then passed through a second stage water-jacketed condenser 3 where additional condensation of liquid takes place at 20° C. Thereafter the gases are passed through third stage liquid condenser 4 maintained, for example, at a temperature of −20° C. Condenser 4 is provided with a fluid jacket 6, which is supplied with brine through conduit 5.

The gases freed of solid metallic chlorides and substantially freed of normally liquid metallic chlorides are now passed through adsorption tower 7 or 8. These towers are filled, for example, with activated carbon, which serves to recover residual normally liquid metallic chlorides. In the normal operation of the process, one of the towers is used for adsorption, while the other tower is having the adsorbed metallic chlorides expelled. In order to expel the adsorbed chlorides, towers 7 and 8 are respectively provided with heating devices 9 and 10 (which may be used for oil heating or electric heating) and with supply conduits 11 and 12 for introducing inert gases such as nitrogen. During the regeneration stage of the adsorbers, the nitrogen loaded with $TiCl_4$ vapors is fed back through conduit 13 into the condenser system.

The gases now substantially freed of both normally solid and normally liquid metallic chlorides are passed through the absorption tower 14 to recover aqueous hydrochloric acid and thence through tower 15 for drying the residual gases substantially freed of chlorides with concentrated sulfuric acid. Tower 15 is provided with pump 46 for recirculation of the concentrated sulfuric acid. The treated residual gas consisting essentially only of carbonaceous material, namely, carbon monoxide and carbon dioxide, flows from the tower 15 through conduit 16. These gases may be used as fuel gases or may be used in the conversion of the recovered metallic chlorides to metallic oxides.

Figure 2:
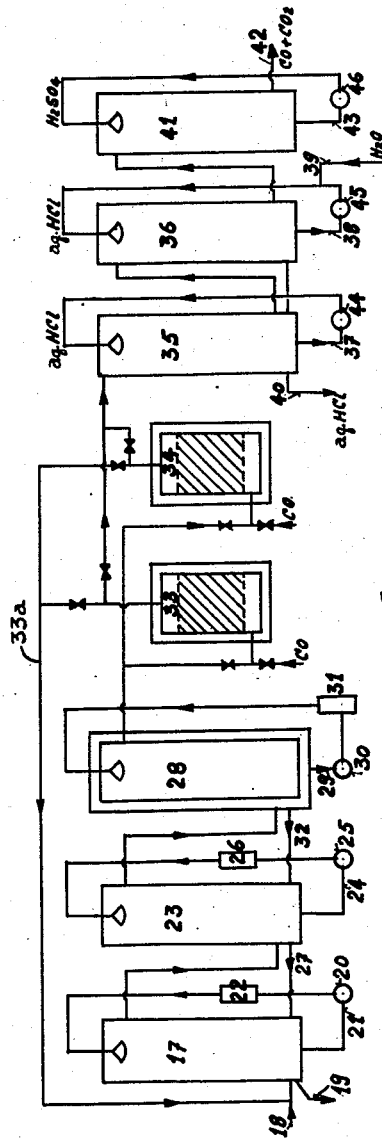
Fig. 2 illustrates an apparatus and flow diagram in which chloride gases are directly irrigated with liquid condensates.

As shown in Fig. 2, a mixture of chloride gases from an outside source (not shown) and recycled gases flowing from a later stage of the process are introduced through conduit 18 into liquid condenser 17. Condenser 17 is provided with a discharge conduit 19 for the condensed liquid metallic chlorides. Condenser 17 is also provided with a liquid metallic chloride circulating conduit 21, containing therein pump 20 and cooler 22. The temperatures in cooler 22 are so adjusted as to give to the metallic chlorides fed to the pump 20 a temperature sufficient to keep the simultaneously condensing normally solid metallic chlorides in solution. The chloride gases flow from condenser 17 into second stage condenser 23, which is provided with a conduit 27 to feed the metallic chlorides condensing therein back into first stage condenser 17. Condenser 23 is also provided with a liquid circulating conduit 24 having therein pump 25 and cooler 26 serving the same purpose as in the first stage condensation.

The chloride gases flow from condenser 23 into the third stage condenser 28, which is provided with a conduit 32 to feed the liquid condensing therein back into second stage condenser 23. Condenser 28 is likewise provided with a liquid circulating conduit 29 having therein a pump 30 and a cooler 31, serving the same purpose as in the first and second stage condensation.

The gases flow from condenser 28 either into adsorption tower 33 or 34 which function in the same manner as adsorption towers 7 and 9 in Fig. 1. For regeneration, carbon monoxide is fed alternately to unit 33 and unit 34 while the regenerating unit is heated to vaporize the TiCl₄ therein. The regenerated TiCl₄ vapors mixed with carbon monoxide are fed back to the first condensation tower 17 through conduit 33a. From the adsorption tower 33 or 34 the gases flow to hydrogen chloride absorption towers 35 and 36 respectively provided with hydrochloric acid circulating conduits 37 and 38 containing pumps 44 and 45. Tower 35 is provided with discharge conduit 40 for the removal of the hydrochloric acid and tower 36 is provided with a conduit connected with tower 35 for the flow of dilute hydrochloric acid from said tower into tower 35. Fresh water is introduced into circulating conduit 38 through conduit 39 to compensate for the hydrochloric acid withdrawn through discharge conduit 40. The gases flow from absorption tower 36 to drying tower 41. This tower 41 is provided with conduit 43 and pump 46 for recirculating a dehydrating agent such as sulfuric acid. The residual gases, now consisting substantially wholly of CO and $CO_2$, are discharged from tower 41 through discharge conduit 42.

Figure 3:
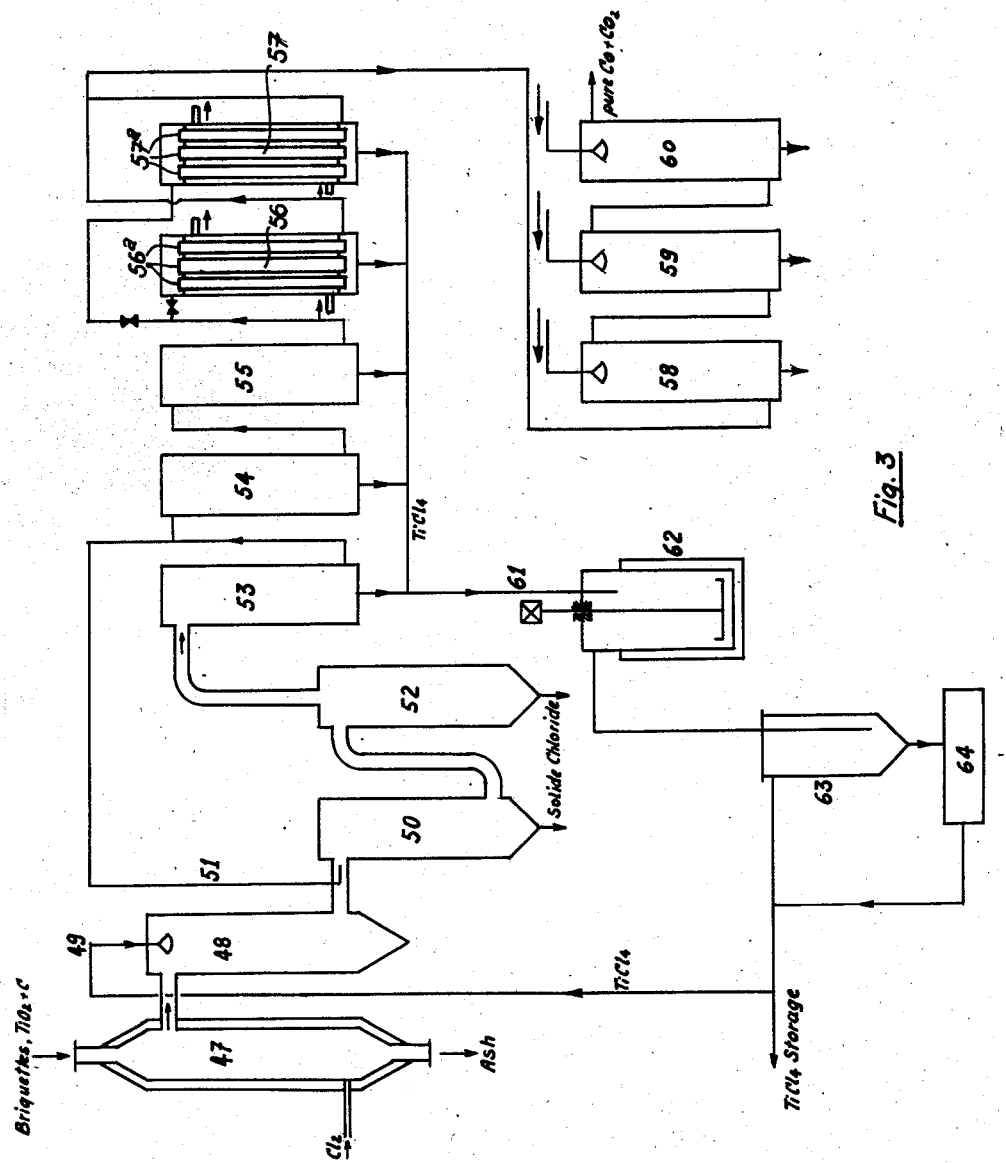
Fig. 3 illustrates an apparatus and flow diagram for a complete and continuous chlorination and separatory process.

As shown in Fig. 3, 47 is a chlorinator wherein briquettes of titanium-containing materials are charged into the top thereof while chlorine is fed into the side near the bottom and ash is removed from the bottom. The chlorination gases flow from the chlorinator to cooling tower 48 cooled by liquid titanium tetrachloride obtained from a later stage in the process and flowing into cooling tower 48 through conduit 49. The liquid titanium tetrachloride cools the gases to a temperature of about 300 to 250° C. The cooled gases flow from cooling tower 48 through a conduit into a water-jacketed tower 50. The conduit leading from cooling tower 48 to 50 is supplied with cooled gases through a conduit 51 leading from a stage of the system subsequent to the first liquid condensation stage. The gases are cooled by the return gases to a temperature of about 200 to 100° C. but above the dew point of the titanium tetrachloride thereby precipitating ferric chloride, zirconium tetrachloride, and the like, as solid chlorides. The water jacket surrounding tower 50, or a like device, may be used to further cool the gases, if necessary, down to very near yet above the dew point of the titanium tetrachloride. In this way additional solid chlorides may be condensed on the seed crystals generated by the introduction of the cooled return gases. The gases pass from tower 50 into a cyclone separator 52 which separates out additional solid metallic chlorides. The gases then flow through three liquid condensers 53 to 55 which serve the same function as the liquid condensers 1, 3 and 4 of Fig. 1. The gases now flow into one of the two coolers 56 and 57 connected in parallel, which serve for freezing out the titanium tetrachloride at temperatures of −40° C. Normally, conventional tubular coolers are used to freeze out the titanium tetrachloride in coolers 56 and 57, as illustrated diagrammatically at 56a and 57a in Fig. 3. The cooling tubes of each cooler unit extend through a chamber within the unit in which a suitable refrigerant is circulated in heat exchange with the tubes during each freezing cycle of the unit, until a suitable amount of frozen solids has deposited in the cooler, and in which a thawing fluid is then circulated to melt the frozen chloride deposit so that it may be drained off to line 61 as indicated in the drawing. The flow of gases alternates between coolers 56 and 57, one cooler being thawed out while the other cooler is being used for freezing. The gases now substantially free of normally solid and normally liquid chlorides flow through hydrochloric acid absorbing or washing towers 58 and 59 and then through dehydrating tower 60 which serve the same function as towers 35, 36 and 41 of Fig. 2. The gases passing from drying tower 60 have substantially all of the chloride values removed and consist essentially of pure CO and $CO_2$. The liquid titanium tetrachloride outflows from the various condensers are introduced into conduit 61 and pass into precipitator 62 which serves as a precipitator for the dissolved solid chlorides. Precipitation on the walls of precipitator 62 is prevented by agitation with a stirrer. The liquid titanium tetrachloride containing certain percentages of suspended solids flows from precipitator 62 into decantation tank 63. Clarified titanium tetrachloride flows from the decantation tank and is either pumped to the cooling tower 48 or is allowed to pass into a storage tank (not shown). The sludge in the bottom of decantation tank 63 passes to filter press 64, from which the recovered liquid titanium tetrachloride is reintroduced into the system.

The following two examples further illustrate the practice of the present invention as carried out in the apparatus of Fig. 2 and Fig. 3:

EXAMPLE 1

One hundred parts of rutile of from 96 to 97 per cent $TiO_2$, 1 to 1.5 per cent FeO, 0.9 to 1.2 per cent $ZrO_2$ and 0.8 to 1 per cent $Cb_2O_5$ are briquetted with 30 parts of petroleum coke and 10 parts of hard pitch, calcined at a temperature of 800° to 900° C. and subsequently chlorinated in a continuously operating shaft furnace at a temperature of 800° C. The chlorination gas is cooled down to a temperature of 120° to 150° C. thereby precipitating the chlorides of iron and zirconium which afterwards are removed from the gas. Thus a chlorination gas is obtained which contains 30 to 33 per cent by volume of TiCl₄, 50 to 55 per cent by volume of CO, 6 to 8 per cent by volume of $CO_2$, 6 to 8 per cent by volume of HCl and 0.2 to 0.3 per cent by volume of CbCl₅.

This chlorination gas is introduced into the apparatus of Fig. 2. The liquid condenser 17 of the first stage is kept at a temperature of 80° C. in which 50 to 60 per cent of the titanium chloride and 80 to 90 per cent of the niobium chloride are condensed. The titanium chloride leaving through discharge conduit 19 at a temperature of 80° C., which contains 1 to 1.2 per cent by weight of NbCl₅, may be cooled down to 0° C. Thus about 90 per cent of the niobium chloride is precipitated which may be obtained by separating it from the titanium chloride by filtration. The liquid condenser 23 of the second stage is operating at a temperature of 40° C., so that again 35 per cent of the titanium chloride and 10 to 20 per cent of the niobium chloride are condensed. The titanium chloride leaving through conduit 27 and entering the liquid condenser 17 contains 0.3 to 0.4 per cent of niobium chloride. The gas is then cooled down to −20° C. in the liquid condenser 28 of the third stage, wherein once more the major part of the titanium chloride is condensed (except a small amount of 0.1 to 0.2 per cent) and a residual gas containing 3 to 6 grams of TiCl₄ per m.³ is obtained. At the same time the remaining niobium chloride is separated out and an overflow to the liquid condenser 23 of the second stage with less than 0.1 per cent of niobium chloride is obtained. The amounts of titanium chloride pumped through the circulation conduits 21, 24 and 29 are many times (5 to 20 times) greater than the quantities of titanium chloride condensing in the respective liquid condensers.

The cold residual gases of the last condensation zone is subsequently passed into one of the two adsorption towers 33 or 34, e. g., 33, which are charged with active carbon. The residual gas leaves adsorption tower 33 with a content of titanium chloride of less than 10 mg. $TiCl_4$ per m.³. The residual gas is passed through the tower until the active carbon has adsorbed titanium chloride to an amount of about 30 per cent of its normal weight. Then the operation is changed over to the second adsorption tower 34 and the first tower is heated to about 300° C. while passing carbon monoxide therethrough which is withdrawn through discharge conduit 42 at the end of the apparatus. The expulsion of titanium chloride is continued, until the active carbon contains only a remaining load of 5 per cent of titanium chloride. The amount of the inert gas is so regulated that the gas leaving the tower contains about 50 per cent by volume of titanium chloride.

Part of the exit gases from adsorption tower 33 or 34 is recycled to cooler 17 to assist in condensing metallic chlorides. The gas freed from titanium chloride leaving the tower just operating on adsorption and filled with a charge of activated carbon is then washed to remove the hydrogen chloride. In the first washing or absorption tower 35 operated with a 20 per cent hydrochloric acid, the content of hydrogen chloride of the residual gas is reduced from about 10 per cent to about 2 per cent. The 20 per cent hydrochloric acid leaving through the discharge conduit 40 contains less than $10^{-3}$ per cent of Ti. A 5 per cent hydrochloric acid is employed in the second washing tower 36 and thus the hydrogen chloride concentration in the gas is reduced to less than 0.1 per cent. In the drying tower 41 the gas is dried by a 96 per cent sulfuric acid. Finally a dry gas with 60 to 90 per cent CO and 10 to 20 per cent $CO_2$ is obtained, which may be employed, for instance, directly for oxidizing $TiCl_4$ according to Swiss Patent 265,192 (U. S. application Ser. No. 75,886).

EXAMPLE 2

A titanium oxide slag consisting of about 71.5% $TiO_2$, 10.5% FeO, 4.5% $SiO_2$, 5.5% $Al_2O_3$, 7.5% MgO and small percentages of $V_2O_5$, $ZrO_2$, $Cr_2O_3$ CaO and MnO is used for chlorination in the apparatus of Fig. 3. One hundred parts of the slag are briquetted with 30 parts of petroleum coke and 10 parts of pitch and calcined. After the calcination the briquettes contain about 75 parts of slag, 24.8 parts of C and 0.2 part of hydrogen.

Seventy-five kg. of briquettes heated to a temperature of 800° C. are charged per hour into a shaft furnace of 45 to 50 cm. inside diameter and of 1.50 m. effective inside height such as shown in furnace 47. Preheated chlorine is introduced at a temperature of 900° C. The reaction takes place at about 800° C. and a chlorination gas is formed which by volume consists of about 26% of $TiCl_4$, 52% CO, 6% $CO_2$, 4.5% $FeCl_3$, 1% $SiCl_4$, 3% $AlCl_3$ and 7.5% HCl. This gas is rapidly cooled down to about 250° C. by introducing about 100 kg. per hour of liquid $TiCl_4$ into cooling tower 48, and by the cooling effect of the walls of the cooling tower 48. Then about 100 m.³/h. of return gas taken off after the first liquid condenser 53 and having a temperature of about 70° C. are added through a conduit 51 to the conduit connecting cooler tower 48 and water-jacketed cooling tower 50.

The temperature of the chlorination gases is thereby lowered to about 180° C., whereby a great part of the ferric chloride condenses. In the cooling tower 50, which is provided with a hot water jacket, the temperature is further decreased to about 100° C., whereby the remaining part of the ferric chloride and part of the aluminum chloride are caused to condense on the already condensed ferric chloride which is suspended in the vapors and acts as a seeding agent. In the cyclone separator 52, which also is kept at a temperature of 100° C., the condensed chlorides are eliminated from the gases. One recovers in the two towers 50 and 52 together about 20 kg./h. of a solid chloride mixture consisting of between 60 to 70% ferric chloride and 30 to 40% aluminum chloride.

The gases then enter the tubular condenser 53 wherein they are cooled down to 70° C. One recovers about 160 kg./h. of $TiCl_4$ containing in solution about 1% by weight of $AlCl_3$ and 0.1% by weight of $FeCl_3$. After leaving the condenser 53 about 100 m.³/h. of the gas is fed back or recycled to aid in the precipitation of the $FeCl_3$. The remaining part of the gases enters the condenser 54, wherein the gases are cooled down to about 30° C., whereby about 25 kg./h. of titanium chloride are recovered.

In condenser 55 wherein the gases are further cooled to —10° C., one obtains about 5 kg./h. of $TiCl_4$.

In the condenser 56 operating at about —40° C., about 5 kg. per day of $TiCl_4$ are frozen out. Every 24 hours flow of gases is alternated between the two coolers 56 and 57.

Whereas the vanadium chloride is distributed in the condensates of all the condensers with about the same cooling, the silicon tetrachloride mainly is collected in the units 55 to 57. Only about 50% of the $SiO_2$ is chlorinated, the other part leaves the system in the ash of the chlorinator together with the excess of carbon, some unchlorinated $TiO_2$ and the $MgCl_2$, $CaCl_2$ and $MnCl_2$. The zirconium chloride and chromium chloride are found for the most part with the ferric chloride.

The gases leave the last cooling zone with a concentration of $TiCl_4$ of about 1 gr./m.³ and enter the hydrogen chloride absorption towers 58 and 59 wherein about 20 kg./h. of 30% hydrochloric acid is produced.

After drying the gases in dehydrating tower 60 one recovers about 25 m.³/h. of a CO gas containing about 10% $CO_2$.

The condensate of all the condensers is led to the precipitator 62 through conduit 61 where it is cooled to room temperature, thereby precipitating between 1.5 to 2 kg. of $AlCl_3$/h. contaminated with about 10% $FeCl_3$. The suspension is fed to the decantation tank 63 and after the sludge is settled out is filtered in the filter press 64. The clarified $TiCl_4$ is divided into two parts, about 100 kg./h. $TiCl_4$ is used as a cooling medium, and the remaining about 90 kg./h. is recovered as a net yield of $TiCl_4$.

This clarified $TiCl_4$ is further purified by known methods, e. g., by treating the liquid at boiling temperature with about 0.5% of a mineral oil thereby forming a carbonization product which adsorbs the small amounts of colored chlorides dissolved in the TiCl4, e. g. vanadium oxychloride. After distillation from the carbonization products, a pure TiCl4 is recovered. A mixture of oxygen and nitrogen is bubbled through this pure TiCl4 at a temperature of about 95° C. The gaseous mixture thereby formed consisting of $O_2$, $N_2$ and TiCl4 vapor is introduced through the innermost tube of a burner consisting of three concentric tubes into a reaction zone kept at 900° C. The CO gas recovered after the separation of the chlorides is introduced through the second tube of said burner and is burnt in the form of a flame with the theoretical amount of oxygen introduced through the outermost tube of said burner. Thereby a very fine $TiO_2$ is produced which is recovered from the decomposition gases by a filtration process. For the production of $TiO_2$ about half to two thirds of the produced CO is used.

The following table may be used as a guide for the dew points of the TiCl4 in various chlorination gas mixtures and also as a guide for temperatures to be maintained in the various liquid condensation zones:

Table

| Dew point of TiCl4 in degrees C. | Concentration of AlCl3 vapor in chlorination gas gr. AlCl3/m.³ | Approximative lower temperature limits in liquid condensation zones | | | |
|---|---|---|---|---|---|
| | | First condensation stage | Second condensation stage | Third condensation stage | Fourth cooling stage |
| | | Degrees | Degrees | Degrees | Degrees |
| 110° | 50 | 80 | 40 | 10 | −30 |
| | 25 | 60 | 20 | −20 | |
| | 10 | 40 | 10 | −30 | |
| 100° | 30 | 60 | 20 | −20 | |
| 90° | 10 | 40 | 10 | −30 | |

Generally speaking there should be temperature differences of not more than about 40° C. between the various cooling zones. Between the dew point of the TiCl4 and the first condensation temperature the temperature difference may be greater if the concentration of $AlCl_3$ in the gas is small.

While the present invention has been described with particular reference to the treatment of vapors of gases containing titanium tetrachloride, certain other normally liquid, certain normally solid, and certain normally gaseous chlorides, it is not limited thereto. The invention may be applied to the treatment of vapors containing various other halides such as the bromides and fluorides as produced by the high temperature halogenation of oxidic materials in the presence of a reducing agent. The general principles of this invention are especially applicable to the separation of normally solid metallic chlorides from other normally liquid metallic chlorides such as chlorides of tin and silicon.

This application is a continuation-in-part of our copending application Serial No. 140,206, filed January 24, 1950, now abandoned. The processes performed in connection with cooling towers 48 and 50 in Fig. 3 of the drawings of this application are disclosed and claimed more particularly in copending applications Serial Nos. 151,244, 151,245, now abandoned, and 224,527, filed respectively on March 22, 1950, March 22, 1950, and May 4, 1951.

The practice of this invention has been exemplified in the specification by various details and examples. It will be understood, however, that these details may be varied widely and that substitutions, additions or omissions can be made without departing from the spirit or the scope of the invention which is intended to be defined by the appended claims.

What is claimed is:

1. A process for separating constituents of a hot gaseous mixture containing in vapor phase at least one normally liquid metal chloride and at least one normally solid metal chloride that condenses substantially in the same temperature range as the normally liquid metal chloride content, as produced by the chlorination at high temperature of oxidic metalliferous material in the presence of carbonaceous reducing material, which comprises cooling the hot gaseous mixture to a temperature near yet above the dew point of the normally liquid metal chloride content, thus condensing a major portion of the normally solid metal chloride content in dry form, separating the dry condensed solid chloride from the remaining gases at a temperature still above said dew point, then passing the remaining gases containing said metal chlorides substantially only in vapor phase progressively through a plurality of successively cooler liquid chloride condensation zones for condensing successive predetermined proportions of said metal chlorides, and condensing quantities of both said normally liquid and said normally solid metal chlorides from the remaining gases in each of said zones while maintaining therein a predetermined condensation temperature at which all the normally solid metal chloride condensed therein is soluble in the amount of normally liquid metal chloride condensed therein.

2. A process for separating constituents of a hot gaseous mixture containing in vapor phase at least one normally liquid metal chloride and at least one normally solid metal chloride that condenses substantially in the same temperature range as the normally liquid metal chloride content, as produced by the chlorination at high temperature of oxidic metalliferous material in the presence of carbonaceous reducing material, which comprises cooling the hot gaseous mixture to a temperature near yet above the dew point of the normally liquid metal chloride content, thus condensing a major portion of the normally solid metal chloride content in dry form, separating the dry condensed solid chloride from the remaining gases at a temperature still above said dew point, then passing the remaining gases containing said chlorides substantially only in vapor phase progressively through a plurality of successively cooler chloride condensation zones for condensing successive predetermined proportions of said metal chlorides, and condensing quantities of both said normally liquid and said normally solid metal chlorides from the remaining gases in each of said zones while maintaining therein a predetermined condensation temperature at which all the normally solid metal chloride condensed therein is soluble in the amount of normally liquid metal chloride condensed therein, withdrawing liquid solutions of said condensed metal chlorides from said zones, cooling said withdrawn solutions to a temperature precipitating dissolved normally solid metal chloride therein, and then separating from the liquid metal chloride the precipitated normally solid metal chloride.

3. A process for separating constituents of a hot gaseous mixture containing in vapor phase at least one normally liquid metal chloride and at least one normally solid metal chloride that condenses substantially in the same temperature range as the normally liquid metal chloride content, as produced by the chlorination at high temperature of oxidic metalliferous material in the presence of carbonaceous reducing material, said mixture also containing a major proportion of carbon monoxide, which comprises cooling the hot gaseous mixture to a temperature near yet above the dew point of the normally liquid metal chloride content, thus condensing a major portion of the normally solid metal chloride content in dry form, separating the dry condensed solid chloride from the remaining gases at a temperature still above said dew point, then passing the remaining gases containing said metal chlorides substantially only in vapor phase progressively through a plurality of successively cooler chloride condensation zones for condensing successive predetermined proportions of said metal chlorides, and condensing quantities of both said normally liquid and said normally solid metal chlorides from the remaining gases in each of said zones while maintaining therein a predetermined condensation temperature at which all the normally solid metal chloride condensed therein is soluble in the amount of normally liquid metal chloride condensed therein, passing the residual gases from said zones, then abstracting from them residual normally liquid metal chloride, and then separately abstracting hydrogen chloride from the residual gases to convert them into a combustible gas rich in carbon monoxide.

4. A process for separating constituents of a hot gaseous mixture containing in vapor phase at least one normally liquid metal chloride and at least one normally solid metal chloride that condenses substantially in the same temperature range as the normally liquid metal chloride content, as produced by the chlorination at high temperature of oxidic metalliferous material in the presence of carbonaceous reducing material, said mixture also containing a major proportion of carbon monoxide, which comprises cooling the hot gaseous mixture to a temperature near yet above the dew point of the normally liquid metal chloride content, thus condensing a major portion of the normally solid metal chloride content in dry form, separating the dry condensed solid chloride from the remaining gases at a temperature still above said dew point, then passing the remaining gases containing said metal chlorides substantially only in vapor phase progressively through a plurality of successively cooler chloride condensation zones for condensing successive predetermined proportions of said metal chlorides, and condensing quantities of both said normally liquid and said normally solid metal chlorides from the remaining gases in each of said zones while maintaining therein a predetermined condensation temperature at which all the normally solid metal chloride condensed therein is soluble in the amount of normally liquid metal chloride condensed therein, passing the residual gases from said zones in contact with active carbon substantially free of adsorbed water and oxygen to remove residual metal chloride from the residual gases, and then passing the residual gases in contact with a liquid absorbent for hydrogen chloride to convert them into a combustible gas rich in carbon monoxide.

5. A process for separating constituents of a hot gaseous mixture obtained by the chlorination at high temperature of impure oxidic titaniferous material in the presence of carbonaceous reducing material and containing in gaseous phase mixed metal chlorides including predominantly titanium tetrachloride and at least one normally solid metal chloride that condenses substantially in the same temperature range as the titanium tetrachloride, which comprises cooling the hot gaseous mixture to a temperature near yet above the dew point of the titanium tetrachloride content, thus condensing a major portion of the normally solid metal chloride content in dry form, separating the dry condensed normally solid chloride from the remaining gases at a temperature still above said dew point, then passing the remaining gases containing said metal chlorides substantially only in vapor phase progressively through a plurality of successively cooler liquid condensation zones for condensing successive predetermined proportions of said metal chlorides, and condensing quantities of both liquid titanium tetrachloride and said normally solid metal chloride from the remaining gases in each of said zones while maintaining therein a predetermined condensation temperature at which all the normally solid metal chloride condensed therein is soluble in the amount of liquid titanium tetrachloride condensed therein.

6. A continuous process for separating chlorides from hot gases produced by the chlorination at high temperature of impure oxidic titaniferous material in the presence of carbonaceous reducing material and containing in vapor phase mixed metal chlorides including a major proportion of normally liquid titanium tetrachloride and minor proportions of normally solid ferric chloride and aluminum chloride, which comprises cooling the chlorination gases to a temperature near yet above the dew point of the titanium tetrachloride content to condense solids comprising ferric chloride, separating the condensed solids in dry form from the remaining gases at a temperature still above said dew point, then passing the remaining gases containing said metal chlorides substantially only in vapor phase into a liquid condensation zone and therein condensing predetermined quantities of both liquid titanium tetrachloride and normally solid aluminum chloride from the gases while maintaining therein a predetermined condensation temperature below said dew point at which all the normally solid metal chloride condensed therein is soluble in the amount of liquid titanium tetrachloride condensed therein.

7. A continuous process for separating chlorides from hot gases produced by the chlorination at high temperature of impure oxidic titaniferous material in the presence of carbonaceous reducing material and containing in vapor phase mixed metal chlorides including a major proportion of normally liquid titanium tetrachloride and minor proportions of normally solid ferric chloride and aluminum chloride, which comprises cooling the chlorination gases to a temperature near yet above the dew point of the titanium tetrachloride content to condense solids comprising ferric chloride, separating the condensed solids in dry form from the remaining gases at a temperature still above said dew point, then passing the remaining gases containing said metal chlorides substantially only in vapor phase progressively through a plurality of successively cooler condensation zones for condensing successive predetermined proportions of said metal chlorides, and condensing both liquid titanium tetrachloride and normally solid aluminum chloride from the gases in each of said zones while maintaining therein a predetermined condensation temperature at which all the normally solid metal chloride condensed therein is soluble in the amount of liquid titanium tetrachloride condensed therein, the temperature of the first liquid condensation zone being held between 40° C. and 80° C. and the difference of temperature between the successive liquid condensation zones being about 30 to 40 degrees C.

8. A process for separating chlorides from hot gases produced by the chlorination at high temperature of impure oxidic titaniferous material in the presence of carbonaceous reducing material and containing in vapor phase mixed metal chlorides including a major proportion of normally liquid titanium tetrachloride and minor proportions of normally solid ferric chloride and normally solid metal chloride from the group consisting of the chlorides and oxychlorides of columbium and tantalum, which comprises cooling the chlorination gases to a temperature near but above the dew point of the titanium tetrachloride content to condense solids comprising ferric chloride, separating the condensed solids in dry form from the remaining gases at a temperature still above said dew point, then passing the remaining gases containing said metal chlorides substantially only in vapor phase progressively through a plurality of successively cooler condensation zones for condensing successive predetermined proportions of said metal chlorides, and condensing quantities of both liquid titanium tetrachloride and normally solid metal chloride from the group consisting of chlorides and oxychlorides of columbium and tantalum from the gases in each of said zones while maintaining therein a predetermined condensation temperature at which all the normally solid metal chloride condensed therein is soluble in the amount of liquid titanium tetrachloride condensed therein.

9. A process for separating chlorides from hot gases produced by the chlorination at high temperature of impure titaniferous material containing more than 2% of aluminum oxide in the presence of carbonaceous reducing material and containing in vapor phase mixed metal chlorides including a major proportion of normally liquid titanium tetrachloride and minor proportions of normally solid ferric chloride and aluminum chloride, which comprises cooling the hot gases to a temperature near but above the dew point of the titanium tetrachloride content, thus condensing from them ferric chloride and part of the aluminum chloride content in dry solid form, separating said condensed solids from the remaining gases at a temperature still above said dew point, then passing the remaining gases containing said metal chlorides substantially only in vapor phase progressively through a plurality of successively cooler condensation zones for condensing successive predetermined proportions of said metal chlorides, and condensing quantities of both liquid titanium tetrachloride and normally solid aluminum chloride from the remaining gases in each of said zones while maintaining therein a predetermined condensation temperature at which all the normally solid metal chloride condensed therein is soluble in the amount of liquid titanium tetrachloride conjointly condensed therein.

10. A process for separating chlorides from a hot gaseous mixture containing in vapor phase normally liquid and normally solid metal chlorides produced by the chlorination at high temperature of oxidic metalliferous materials in the presence of carbonaceous reducing material, said mixture also containing a major proportion of carbon monoxide, which comprises cooling the hot gaseous mixture to a temperature near yet above the dew point of the normally liquid metal chloride content, thus condensing a major portion of the normally solid metal chloride content in dry solid form, separating the dry condensed solid chloride from the remaining gases at a temperature still above said dew point, then passing the remaining gases containing said metal chlorides substantially only in vapor phase progressively through a plurality of successively cooler liquid chloride condensation zones for condensing successive predetermined proportions of said metal chlorides, and condensing quantities of both said normally solid and said normally liquid metal chlorides from the remaining gases in each of said zones while maintaining therein a predetermined condensation temperature at which the amount of normally solid metal chloride condensed therein is soluble in the amount of normally liquid metal chloride conjointly condensed therein, and thereafter passing the residual gases through a condensation zone maintained at a temperature below the melting point of said normally liquid metal chloride to precipitate an additional quantity thereof in solid form, and separating the solid normally liquid metal chloride to obtain a gas substantially free of metal chlorides and consisting principally of carbon monoxide.

11. A process for separating constituents of hot gases produced by the chlorination at high temperature of impure oxidic titaniferous material in the presence of carbonaceous reducing material and containing in vapor phase mixed metal chlorides including a major proportion of normally liquid titanium tetrachloride and a minor proportion of at least one normally solid metal chloride that condenses substantially in the same temperature range as the $TiCl_4$, said gases also containing a major proportion of carbon monoxide, which comprises cooling the hot chlorination gases to a temperature of between 200° and 100° C. that is near yet above the dew point of their normally liquid metal chloride content, thus condensing in dry solid form a major part of their normally solid metal chloride content, separating the dry condensed solids from the remaining gases at a temperature still above said dew point, then further cooling the remaining gases containing said metal chlorides entirely in vapor phase by passing the gases progressively through a plurality of successively cooler liquid condensation zones for condensing successive predetermined proportions of said metal chlorides, and condensing quantities of both liquid titanium tetrachloride and said normally solid metal chloride from the remaining gases in each of said zones while maintaining therein a predetermined temperature below said dew point at which the amount of normally solid metal chloride condensed therein is soluble in the amount of liquid titanium tetrachloride condensed therein, then passing the remaining gases through a condensation zone maintained at a temperature below the melting point of the titanium chloride to precipitate residual titanium tetrachloride in solid form, thereafter contacting the residual gases with a liquid absorbent for hydrogen chloride, and finally drying the residual gases to obtain a dry combustible gas substantially free of chlorides and rich in carbon monoxide.

12. A process for separating chlorides from hot gases produced by the chlorination at high temperature of impure oxidic titaniferous material in the presence of carbonaceous reducing material and containing in vapor phase mixed metal chlorides including a major proportion of normally liquid titanium tetrachloride and minor proportions of normally solid ferric chloride and aluminum chloride, which comprises cooling the chlorination gases to a temperature near but above the dew point of the titanium tetrachloride content, thus condensing most of the normally solid metal chloride content in dry solid form, separating the dry condensed solids from the remaining gases at a temperature still above said dew point, then passing the remaining gases into a first liquid condensation zone and condensing quantities of liquid titanium tetrachloride and normally solid aluminum chloride from the gases therein while maintaining said zone at a temperature between said dew point and 40° C. at which all the normally solid metal chloride condensed therein is soluble in the quantity of liquid titanium tetrachloride condensed therein, then passing the gases into a second liquid condensation zone and therein condensing further quantities of liquid titanium tetrachloride and normally solid metal chloride while maintaining therein a temperature between the temperature of said first zone and 10° C. at which the further quantity of condensed normally solid metal chloride is completely soluble in the further quantity of condensed liquid titanium tetrachloride, and then passing the gases through another condensation zone at a temperature between the temperature of said second zone and −30° C. to condense another quantity of liquid titanium tetrachloride from the gases.

13. A process for separating constituents of a hot gaseous mixture produced by the halogenation at high temperature of oxidic metalliferous material in the presence of carbonaceous reducing material and containing in vapor phase mixed metallic halides including a major proportion of at least one normally liquid metal halide and a minor proportion of at least one normally solid metal halide that condenses substantially in the same temperature range as the normally liquid halide content, which comprises cooling the hot gaseous mixture to a temperature near yet above the dew point of the normally liquid metal halide content, thus condensing a major part of the normally solid metal halide content in dry solid form, separating the dry condensed solid halide from the remaining gases at a temperature still above said dew point, then passing the remaining gases containing said metal halides substantially only in vapor phase progressively through a plurality of successively cooler condensation zones for condensing successive predetermined proportions of said metal halides, and condensing quantities of both said normally liquid and said normally solid metal halides from the remaining gases in each of said zones while maintaining therein a temperature below said dew point at which all the normally solid metal halide condensed therein is soluble in the amount of liquid metal halide condensed therein.

14. A process for separating chlorides from a hot gaseous mixture produced by the chlorination at high temperature of oxidic metalliferous materials in the presence of a carbonaceous reducing material and containing mixed metal chloride vapors including a major proportion of at least one normally liquid metal chloride and a minor proportion of at least one normally solid metal chloride, said mixture also containing a major proportion of carbon monoxide, which comprises cooling the hot gaseous mixture to a temperature near yet above the dew point of the normally liquid metal chloride content, thus condensing at least a major part of said normally solid metal chloride content from the mixture in dry solid form, separating the dry condensed solid chloride from the remaining gases at a temperature above said dew point, then condensing most of the normally liquid metal chloride content from the remaining gases to liquid form in a plurality of condensation zones maintained at successively lower temperatures between said dew point and −30° C., and then passing the residual gases into a condensation zone maintained at a temperature below the melting point of said normally liquid metal chloride and therein condensing residual normally liquid metal chloride from the residual gases to solid form, and separating the solid normally liquid metal chloride to obtain a gas substantially free of metal chlorides and consisting principally of carbon monoxide.

15. A process for separating constituents of a hot gaseous mixture containing substantially entirely in vapor phase mixed metallic chlorides including a major proportion of at least one normally liquid metal chloride and a minor proportion of at least one normally solid metal chloride that condenses substantially in the same temperature range as the normally liquid metal chloride content, which comprises cooling the hot gaseous mixture to a temperature near yet above the dew point of the normally liquid metal chloride content, thus condensing at least part of said normally solid metal chloride content from the mixture in dry solid form, separating the dry condensed solid chloride from the remaining gases at a temperature above said dew point, then further cooling said gaseous mixture substantially free of suspended solids in one condensation zone through a limited temperature range from above to a predetermined temperature below the dew point of the normally liquid metal chloride content, said temperature being one at which the entire amount of said at least one normally solid metal chloride condensed in said zone is soluble in the amount of said at least one normally liquid metal chloride condensed therein, thus fractionally condensing said chlorides in said zone only in the form of a liquid solution of normally solid metal chloride in normally liquid metal chloride, then passing the remaining gases from said one zone into a cooler condensation zone and further condensing normally liquid metal chloride from the gases in the latter.

16. A process for separating constituents of a hot gaseous mixture containing substantially entirely in vapor phase mixed metallic chlorides including a major proportion of at least one normally liquid metal chloride and a minor proportion of at least one normally solid metal chloride that condenses substantially in the same temperature range as the normally liquid metal chloride content, which comprises cooling the hot gaseous mixture to a temperature near yet above the dew point of the normally liquid metal chloride content, thus condensing at least part of said normally solid metal chloride content from the mixture in dry solid form, separating the dry condensed solid chloride from the remaining gases at a temperature above said dew point, then further cooling said gaseous mixture substantially free of suspended solids in one condensation zone through a limited temperature range from above to a predetermined temperature below the dew point of the normally liquid metal chloride content, said temperature being one at which the entire amount of said at least one normally solid metal chloride condensed in said zone is soluble in the amount of said at least one normally liquid metal chloride condensed therein, thus separating condensed chlorides from gases in said zone only in the form of a liquid solution of normally solid metal chloride in normally liquid metal chloride, then passing the remaining gases from said one zone into a cooler condensation zone and further condensing normally liquid metal chloride from the gases in the latter, and withdrawing said solution from said one zone and thereafter separating its normally solid and normally liquid metal chloride constituents.

17. A process for separating constituents of a hot gaseous mixture containing substantially entirely in vapor phase mixed metallic chlorides including a major proportion of at least one normally liquid metal chloride and a minor proportion of at least one normally solid metal chloride that condenses substantially in the same temperature range as the normally liquid metal chloride content, which comprises cooling said gaseous mixture substantially free of suspended solids and condensing quantities of both said normally liquid and said normally solid metal chlorides therefrom in each of a plurality of successive progressively cooler liquid condensation zones while maintaining each of said zones at a temperature below the dew point of the normally liquid metal chloride content and at which the amount of said at least one normally solid metal chloride therein condensed is completely soluble in the amount of said at least one normally liquid metal chloride therein condensed, thus separating normally solid metal chloride in each of said zones only in the form of a liquid solution thereof in liquid metal chloride.

18. A process for separating constituents of a hot gaseous mixture containing substantially entirely in vapor phase mixed metallic chlorides including a major proportion of normally liquid titanium tetrachloride and a minor proportion of normally solid aluminum chloride that is not completely soluble at room temperature in the titanium tetrachloride content of the mixture, which comprises cooling said mixture substantially free of suspended solids and condensing quantities of both liquid titanium tetrachloride and normally solid aluminum chlorides therefrom in each of a plurality of successive progressively cooler condensation zones while maintaining each of said zones at a temperature at which the amount of normally solid aluminum chloride therein condensed is completely soluble in the amount of liquid titanium tetrachloride therein condensed, the first of said zones being maintained at a temperature between 40° C. and 80° C. and the temperature difference between the successive zones being not more than about 40 degrees C., thus separating aluminum chloride in each zone only in the form of a liquid solution thereof in liquid titanium tetrachloride, and withdrawing the liquid solutions from said zones, mixing the withdrawn solutions, and thereafter separating their normally solid and normally liquid constituents.

References Cited in the file of this patent

UNITED STATES PATENTS

| Number | Name | Date |
| --- | --- | --- |
| 2,245,358 | Pechukas | June 10, 1941 |
| 2,311,466 | Pechukas | Feb. 16, 1943 |
| 2,519,874 | Berg | Aug. 22, 1950 |

FOREIGN PATENTS

| Number | Country | Date |
| --- | --- | --- |
| 262,475 | Great Britain | Dec. 6, 1926 |